(12) United States Patent
Udriste et al.

(10) Patent No.: US 12,459,647 B2
(45) Date of Patent: Nov. 4, 2025

(54) AIRCRAFT SEAT MODULE

(71) Applicant: RECARO Aircraft Seating GmbH & Co. KG, Schwaebisch Hall (DE)

(72) Inventors: Daniel Udriste, Schwaebisch Hall (DE); Maik Thiele, Stuttgart (DE); Thomas Drenzeck, Michelfeld (DE); Hermann Hoffmann, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 18/556,749

(22) PCT Filed: Apr. 28, 2022

(86) PCT No.: PCT/EP2022/061418
§ 371 (c)(1),
(2) Date: Oct. 23, 2023

(87) PCT Pub. No.: WO2022/229356
PCT Pub. Date: Nov. 3, 2022

(65) Prior Publication Data
US 2024/0327002 A1   Oct. 3, 2024

(30) Foreign Application Priority Data

Apr. 28, 2021 (DE) .................. 10 2021 110 957.4

(51) Int. Cl.
*B64D 11/06* (2006.01)
*B64D 11/00* (2006.01)

(52) U.S. Cl.
CPC ...... *B64D 11/0601* (2014.12); *B64D 11/0015* (2013.01); *B64D 11/0605* (2014.12);
(Continued)

(58) Field of Classification Search
CPC ............ B64D 11/0601; B64D 11/0015; B64D 11/0605; B64D 11/0606; B64D 11/0619;
(Continued)

(56) References Cited

U.S. PATENT DOCUMENTS

| 9,403,597 B2 | 8/2016 | Ferry et al. |
| 2008/0088160 A1 | 4/2008 | Johnson |

(Continued)

FOREIGN PATENT DOCUMENTS

| DE | 102018112106 A1 | 11/2019 |
| DE | 102019108490 A1 | 10/2020 |

(Continued)

OTHER PUBLICATIONS

Office Action dated Mar. 21, 2022 issued in corresponding German Patent Application No. 102021110957.4 (and English translation).
(Continued)

*Primary Examiner* — Joshua D Huson
*Assistant Examiner* — Vicente Rodriguez
(74) *Attorney, Agent, or Firm* — Posz Law Group, PLC

(57) ABSTRACT

An aircraft seat module, which forms an aircraft seat region, includes an aircraft seat that is configured to be mounted in an aircraft cabin at an angle α of 30 degrees to 80 degrees, preferably 45 degrees to 65 degrees, and that comprises at least a base frame and a cinematics unit, with an enclosure unit comprising a first enclosure element, which delimits the aircraft seat region at least partially in the region of the aircraft seat, and a second enclosure element, which delimits the aircraft seat region partially at least in a region in front of the aircraft seat, and includes an ottoman providing a footrest region, and with a console unit that forms at least one stowage and/or depositing region of the aircraft seat region, wherein the aircraft seat is combined in a separately realized 16G module and the second enclosure element, the
(Continued)

Figure 1:
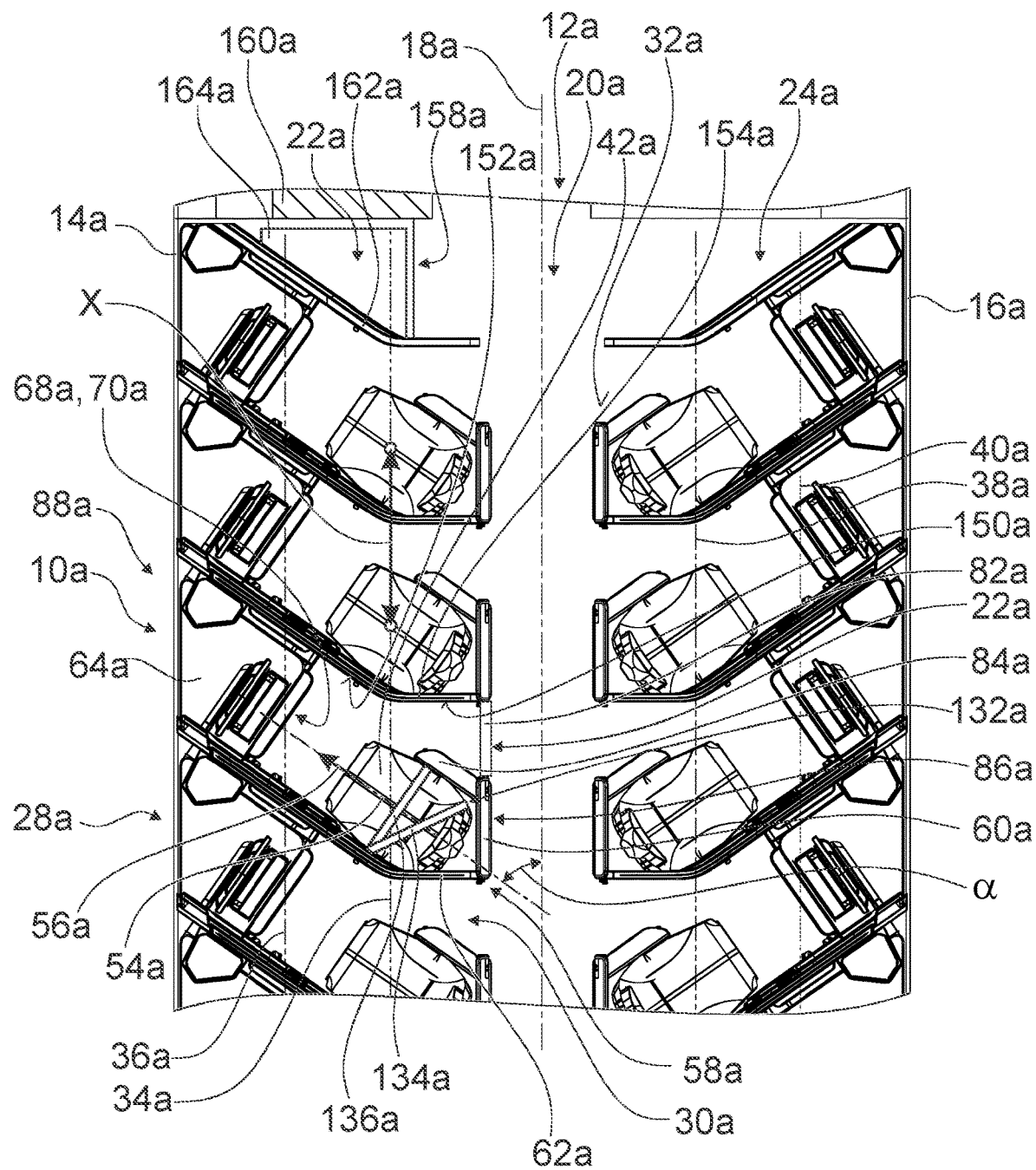

ottoman and the console unit are combined in a separately realized 9G module, wherein the 16G module and the 9G module are configured to be fastened to a cabin floor separately from each other.

15 Claims, 5 Drawing Sheets

(52) U.S. Cl.
CPC ...... *B64D 11/0606* (2014.12); *B64D 11/0619* (2014.12); *B64D 11/0636* (2014.12); *B64D 11/0696* (2013.01)

(58) Field of Classification Search
CPC ............ B64D 11/0636; B64D 11/0696; B64D 11/00152; B64D 11/0604
See application file for complete search history.

(56) References Cited

U.S. PATENT DOCUMENTS

| | | | |
|---|---|---|---|
| 2010/0065683 A1* | 3/2010 | Darbyshire | B64D 11/0643 244/118.6 |
| 2010/0308164 A1 | 12/2010 | McKeever | |
| 2015/0202992 A1* | 7/2015 | Cailleteau | B60N 2/015 297/248 |
| 2016/0332734 A1* | 11/2016 | Goode | B64D 11/06395 |
| 2017/0233057 A1 | 8/2017 | Charles et al. | |
| 2018/0281972 A1* | 10/2018 | Jacobsen | B64D 11/0639 |
| 2019/0092475 A1 | 3/2019 | Carlioz et al. | |
| 2019/0248497 A1 | 8/2019 | Ersan | |
| 2019/0276151 A1 | 9/2019 | Dryburgh | |
| 2020/0062403 A1* | 2/2020 | Williams | B64D 11/0602 |
| 2022/0106044 A1* | 4/2022 | Pence | B64D 11/0606 |

FOREIGN PATENT DOCUMENTS

| | | |
|---|---|---|
| WO | 2018/078377 A1 | 5/2018 |
| WO | 2021/156614 A1 | 8/2021 |
| WO | 2021/176209 A1 | 9/2021 |

OTHER PUBLICATIONS

International Preliminary Report on Palatability of the International Search Authority mailed Oct. 24, 2023 and Written Opinion of the International Searching Authority mailed Aug. 9, 2022 in corresponding International Application No. PCT/EP2022/061418.

International Search Report of the International Searching Authority mailed Aug. 9, 2022 for the corresponding International Patent Application No. PCT/EP2022/061418 (and English translation).

* cited by examiner

AIRCRAFT SEAT MODULE

CROSS-REFERENCE TO RELATED APPLICATIONS

This patent application is a U.S. national stage application of international patent application PCT/EP2022/061418, filed on Apr. 28, 2022, which is based on and claims priority to German patent application DE 10 2021 110 957.4, filed on Apr. 28, 2021, the contents of which are incorporated herein by reference.

PRIOR ART

The invention concerns an aircraft seat module.

An aircraft seat module which forms an aircraft seat region, with an aircraft seat that is configured to be mounted in the aircraft cabin at an angle α of 30 degrees to 80 degrees, preferably 45 degrees to 65 degrees, and that comprises at least a base frame and a cinematics unit, with an enclosure unit comprising a first enclosure element that delimits the aircraft seat region at least partially in the region of the aircraft seat, and a second enclosure element that delimits the aircraft seat region partially at least in a region in front of the aircraft seat, with an ottoman that provides a footrest region, and with a console unit that forms at least one stowage and/or depositing region of the aircraft seat region, has already been proposed.

The objective of the invention is in particular to provide a generic device with improved characteristics with regard to easy approval and low weight. The objective is achieved according to the invention.

Advantages of the Invention

The invention is based on an aircraft seat module which forms an aircraft seat region, with an aircraft seat that is configured to be mounted in the aircraft cabin at an angle α of 30 degrees to 80 degrees, preferably 45 degrees to 65 degrees, and that comprises at least a base frame and a cinematics unit, with an enclosure unit comprising a first enclosure element, which delimits the aircraft seat region at least partially in the region of the aircraft seat, and a second enclosure element, which delimits the aircraft seat region partially at least in a region in front of the aircraft seat, with an ottoman providing a footrest region, and with a console unit that forms at least one stowage and/or depositing region of the aircraft seat region.

It is proposed that the aircraft seat is combined in a separately realized 16G module, and the second enclosure element, the ottoman and the console unit are combined in a separately realized 9G module, wherein the 16G module and the 9G module are configured to be fastened to a cabin floor separately from each other. By an "aircraft seat module" is a module to be understood which comprises at least one aircraft seat and further components of the aircraft seat region. The aircraft seat module is configured to be fixedly mounted on the cabin floor via an appropriate fastening means. The aircraft seat module is realized as a module defining an aircraft seat region and for this purpose comprising at least a portion of the enclosure unit that delimits the aircraft seat region at least partially from a remaining cabin region, at least one aircraft seat that is arranged in the aircraft seat region, and further elements of the aircraft seat region, like in particular a console, an ottoman, a table unit, a stowage unit, and/or a monitor unit. The aircraft seat module is preferably part of an aircraft seat arrangement. An "aircraft seat arrangement" is to mean an arrangement of several aircraft seat modules which are mounted in at least one row on a mounting plane, in particular on a cabin floor of an aircraft cabin. The aircraft seat arrangement comprises several aircraft seat modules. The aircraft seat arrangement is configured to be used in an aircraft cabin of an aircraft. The aircraft cabin has an aircraft cabin middle axis. The aircraft cabin middle axis has respectively a same distance to side panels of the aircraft cabin which are situated opposite each other. The aircraft cabin middle axis is oriented parallel to a rolling axis of the aircraft. Preferably the aircraft cabin middle axis is oriented parallel to a mounting plane of the aircraft cabin. The aircraft cabin preferably has an aircraft cabin floor which forms the mounting plane. The aircraft seat modules of the aircraft seat arrangement are configured to be mounted on the cabin floor of the aircraft cabin. The aircraft cabin preferably has precisely one central aisle. A "central aisle" is to mean an aisle between two rows of aircraft seat modules, via which the aircraft seat modules of the aircraft seat arrangement are accessible. Preferably precisely one central aisle is provided. The aircraft seat arrangement is preferably configured for an aircraft cabin with precisely one central aisle. Preferentially the at least one central aisle extends at least substantially parallel to the aircraft cabin middle axis. By an "aircraft seat region" is herein preferably a region to be understood which is personally available to a passenger in the aircraft cabin, preferably while the passenger is using the aircraft seat module, wherein preferably all the parts of the one aircraft seat module are arranged in the aircraft seat region. The aircraft seat of the aircraft seat module is configured to provide a place to sit for a passenger in the aircraft. The aircraft seat comprises at least a seat bottom and a backrest. Preferably the aircraft seat comprises at least one armrest. In addition, it would be conceivable that the aircraft seat comprises a leg support. Principally the aircraft seat may comprise further add-on components, like preferably a headrest. Preferentially the aircraft seat comprises a three-point belt unit. via which a passenger can be secured on the aircraft seat. A "three-point belt unit" is herein in particular to mean a retaining unit by means of which, at least in a closed state, a passenger is held on the seat, the retaining unit comprising for this purpose at least one belt strap that is preferably embodied as a fabric strap and that is in the closed state fixedly connected with the aircraft seat, in particular with a load-bearing structure of the aircraft seat, in at least three connection points. Herein the three connection points of the three-point belt unit are in a closed state all connected to one another via the at least one belt strap. The three-point belt unit is herein preferably embodied as a three-point belt. For this the three-point belt unit is in at least one point connected with the aircraft seat, preferably in a continuous non-detachable manner, and is, at least in a closed state of the three-point belt unit, fixedly connected with the aircraft seat in two further points. The three-point belt unit preferably comprises a lap strap, which in the closed state spans across the seat bottom and in particular secures a pelvis and hip region of the passenger. The three-point belt unit preferably comprises a shoulder strap, which in a closed state spans across the backrest, thus securing the passenger's torso. Preferably the three-point belt unit comprises a belt tightener. Principally it is also conceivable that the aircraft seat comprises a different belt, in particular a multipoint belt, like for example a five-point belt. Using a three-point belt unit with the aircraft seat advantageously allows dispensing with an airbag in the aircraft seat module. Preferably the aircraft seat is-preferably electromechanically-adjustable between a sitting position and a lying-down position. Preferably the aircraft seat is embodied as a full-flat seat. By a "full-flat seat" is preferably an aircraft seat to be understood which is—in particular electro-mechanically—transferable from the TTL position into the lying-down position and forms an at least substantially planar lying-down surface in the lying-down position. Preferably the at least substantially planar lying-down surface is inclined by an angle of 3° with respect to the mounting plane. Particularly preferentially at least a seat bottom of the aircraft seat and a backrest of the aircraft seat are in the lying-down position aligned at least substantially parallel to the mounting plane which the aircraft seat is mounted on. The aircraft seat is configured to provide in the lying-down position the substantially planar lying-down surface on which an average passenger can lie down and stretch out. By an "at least substantially planar lying-down surface" is a lying-down surface to be understood which is preferably continuously planar; however, it is principally also conceivable that an angle ß different from 180° is included between a backrest surface of the backrest and a sitting surface of the seat bottom, which form the lying-down surface in the lying-down position of the aircraft seat. Preferably, the angle β may herein be between 150° and 179°. Preferably a maximal lying-down surface length of the aircraft seat in its lying-down position is at least 1905 mm (75 inches). Preferentially the lying-down surface length is at least 1981 mm (78 inches), particularly preferably 2006 mm (79 inches). This implementation allows providing an advantageously long lying-down surface length. As a result, an advantageously comfortable aircraft seat module is achievable. Preferably the maximal lying-down surface length is determined by means of a 9-inch-ball method, in which two balls, which are spaced apart from each other and have a diameter of 9 inches, are used for measuring the lying-down surface length. Preferably the maximal lying-down surface length is equivalent to a distance of maximally spaced-apart points of the two balls in the aircraft seat region. Preferentially the two balls lie upon the lying-down surface of the aircraft seat. Preferably the lying-down axis runs parallel to or along a straight line which connects the maximally spaced-apart points of the two balls to each other.

A "TTL position" is preferably to mean an upright position of the aircraft seat which must be taken for safety reasons, in particular in a rolling phase, in a start phase and in a landing phase of the aircraft.

By the aircraft seat being "mounted in the aircraft cabin at an angle α" is to be understood that the aircraft seat is attached in the aircraft cabin such that it is pivoted by the angle α relative to the aircraft cabin middle axis. The angle α by which the aircraft seat is pivoted is measured between the sitting direction, i.e. the longitudinally-extending middle axis of the aircraft seat, and the aircraft cabin middle axis. By the aircraft seat being pivoted by an angle α of at least 30 degrees is to be understood that the angle α is at least 30 degrees, and is preferably in an angle range of 35 degrees to 80 degrees, particularly preferably in an angle range of 45 degrees to 60 degrees. In a preferred embodiment the angle α by which the aircraft seat is pivoted with respect to the aircraft cabin middle axis is 55 degrees.

By a "sitting direction of an aircraft seat" is a direction to be understood which is aligned parallel to the cabin floor and at least substantially perpendicular to a backrest surface formed by the backrest. The sitting direction is preferably aligned parallel to a longitudinally-extending middle axis of the aircraft seat. A "base frame" is preferably to mean a load-bearing base frame of the aircraft seat, which may comprise movable components for an adjustment of the aircraft seat between its sitting position and its lying-down position. The base frame forms an assembly frame for components of the aircraft seat. Preferably the aircraft seat is mounted to the corresponding module via the base frame. A "cinematics unit" is to mean a unit comprising an adjusting mechanics unit with at least one actuator, preferably several actuators, that is configured for an adjustment of the aircraft seat between its sitting position and its lying-down position. By an "enclosure unit" is preferably a unit to be understood which is formed of at least one element, in particular of at least one enclosure element, and which physically separates the aircraft seat region, at least up to a maximal height, permanently from a portion of the aircraft cabin, in particular from a further aircraft seat region which is arranged in front of and/or behind the aircraft seat region, and/or from the middle aisle. The enclosure unit is realized as a separating unit which separates the aircraft seat region from the central aisle and from at least one further aircraft seat region. The enclosure unit may, for example, comprise the two enclosure elements, which in each case delimit a portion of the aircraft seat region. The two enclosure elements are preferably realized so as to be at least partly separate from each other. The two enclosure elements may preferably be realized as independent elements. It is principally also conceivable that the two enclosure elements of the enclosure unit are realized at least partly integrally with each other, in particular if they form part of the same module, in particular the 9G module. The aircraft seat module forms a passage region in which the aircraft seat module is realized free from the enclosure unit, wherein the aircraft seat region formed by the aircraft seat module is accessible through the passage region. "At least partly delimiting" is to mean that the enclosure unit delimits the aircraft seat region at least up to a maximal height of the enclosure unit and a passage region is left open via which the aircraft seat region can be reached. A "region in front of the aircraft seat" is to mean a region that is, in the sitting direction of the aircraft seat in a sitting position, arranged in front of the aircraft seat.

By an "ottoman" an element is to be understood which comprises at least one support element and is thus at least configured to provide a footrest region for a passenger. A "footrest region" is to mean a region that forms a, "preferably cushioned", surface which is configured such that a passenger may rest his feet on it from the aircraft seat. In the lying-down position of the aircraft seat, the footrest region forms the substantially planar lying-down surface together with the aircraft seat.

By a "console unit" is preferably a unit to be understood which comprises at least one functional element, preferably several functional elements, which is/are configured to be used by a passenger. A functional element may mean a stowage facility, a monitor unit, a tablet holder, a cupholder, an operating unit, a plug unit or another unit deemed expedient by someone skilled in the art, which is made available to a passenger during a flight. By a "stowage and/or depositing facility" is preferably a region or an element to be understood in which utensils and literature can be stowed. A stowage facility may preferably mean a deposition compartment, a deposition shelf, a lockable stowage compartment, or a fixing means, like for example an elastic tensioning strap.

By respective components being "combined in" a module is to be understood that the combined components are combined to form an assembly module in which they are together connectable to the cabin floor via respective mounting points, in particular respective fittings. Components combined in a module are configured to be connected to the cabin floor via the same mounting points, in particular fittings. The components combined in a module, which are mountable together on the cabin floor in the aircraft cabin, form an assembly unit. A "16G module" is to mean a module which has to pass a 16G crash test for approval. The module that is embodied as a 16G module is configured for a 16G approval test. The 16G module preferably comprises all the components of the aircraft seat module which are configured such that a passenger can sit thereon in a regular manner during a flight, like in particular a seat. By a "9G module" is a module to be understood which has to pass a 9G crash test for approval. The module that is embodied as a 9G module is configured for a 9G approval test. Preferably all those components of the aircraft seat module are assigned to the 9G module which form pieces of furniture of the aircraft seat region that are not configured such that a passenger sits thereon in a regular manner during a flight. "Fastened to a cabin floor separately from each other" is to mean that the two modules are connectable to the cabin floor via respectively different mounting points, in particular fittings. "Configured" is in particular to mean specifically designed and/or equipped. By an object being configured for a certain function is in particular to be understood that the object fulfils and/or executes said certain function in at least one application state and/or operation state. An implementation according to the invention advantageously allows separate testing of the different modules for an approval procedure in a corresponding crash test. By the respective composition of the 16G module and the 9G module, especially advantageous apportionment of the components of the aircraft seat module is achievable. In particular, the components combined in the 9G module have to stand smaller loads in the respective crash test, and advantageously may hence be given less strong dimensions. This allows realizing in particular parts of the 9G module, and thus the entire 9G module, in an especially lightweight manner. This allows providing an aircraft seat module that is advantageously lightweight as a whole.

It is further proposed that the first enclosure element forms part of the separately realized 16G module. Preferably the first enclosure element, which forms part of the 16G module, is embodied separately from the second enclosure element, which forms part of the 9G module. This enables particularly simple connection of the first enclosure element to the cabin floor.

Furthermore, it is proposed that the 16G module and/or the 9G module are/is in each case configured to be fixedly coupled with the cabin floor via three mounting points. By an "mounting point" is preferably a point to be understood in which a module is fixedly mountable on a mounting plane, in particular on the cabin floor, via an appropriate fastening means, like in particular a fitting. As a result, the 16G module and the 9G module can in each case be connected in an especially advantageous manner.

It is also proposed that the 16G module comprises an assembly frame, which is configured for a connection to the cabin floor and for this purpose comprises three fitting elements, each of which is configured for a connection to a fastening rail. An "assembly frame" is preferably to mean a structural frame on which the respective components of the 16G module are fixedly mountable. Preferably the base frame of the aircraft seat is mounted on the assembly frame. Preferably the base frame of the aircraft seat is connected to the assembly frame such that is displaceable via a linear guiding. A "fitting element" is to mean an element which is in at least one operation state configured for a fastening of an aircraft seat module to a floor, in particular to a cabin floor of an aircraft cabin, and is for this purpose held in a recess in the cabin floor, in particular in a fastening rail in the floor. Preferably the fitting element includes at least one fastening unit comprising at least one fastening means. In particular, the fitting element is supported in the recess of the floor such that it is movable along an axis that is aligned at least substantially parallel to the floor. In a fixedly mounted state, the fitting element is fastened in the fastening rail in the cabin floor in a positionally secure manner. Preferably the fitting element is in a mounted state fixedly connected with a load-bearing structure of the corresponding module, in particular the assembly frame. This allows furnishing the 16G module such that it is particularly easily and securely mountable to the cabin floor.

It is moreover proposed that the assembly frame comprises a main assembly region and a beam that extends away from the main assembly region, the aircraft seat being connected in the main assembly region. The main assembly region preferably forms a linear guide, via which the aircraft seat is supported with its base frame displaceably in the main assembly region. This allows realizing the assembly frame for a connection of the aircraft seat in an especially simple manner and with advantageously low weight.

Furthermore, it is proposed that one of the fitting elements is connected to an end of the beam that is distant from the main assembly region. In this way the assembly frame can be mounted on the cabin floor in an especially advantageous and functionally secure manner.

Beyond this it is proposed that two of the fitting elements, which are configured for a connection to the same fastening rail, are arranged in the main assembly region of the assembly frame. The two fitting elements attached in the main assembly region are in the mounted state fixed in the same guide rail in different positions. In this way, for a connection of the aircraft seat at an angle of 35 degrees to 80 degrees, the assembly frame can be connected to the cabin floor in a particularly simple and secure manner.

It is also proposed that the aircraft seat module comprises a door element, which is displaceably connected with the first enclosure element and forms part of the 16G module. By a "door element" is preferably an element to be understood which is configured for closing a passage region to the aircraft seat region. The door element is preferably supported such that it is linearly displaceable relative to the first enclosure element via a linear guide. The door unit is fastened to the cabin floor via the first enclosure element and the assembly frame of the 16G module. This particularly advantageously allows integrating the door element into the aircraft seat module.

It is further proposed that the aircraft seat module comprises an armrest element, which is displaceably connected with the first enclosure element and forms part of the 16G module. By an "armrest element" is preferably an element to be understood which forms an arm support region for a passenger sitting on the aircraft seat. The armrest element is arranged at least substantially next to the seat bottom of the aircraft seat. The armrest element is arranged between the seat bottom of the aircraft seat and a passage region to the aircraft seat region. The armrest element is preferably supported such that it is adjustable. Preferably the armrest element is adjustable in its height as well as in its horizontal position. This allows especially advantageous integration of the armrest element into the aircraft seat module and advantageously comfortable implementation of the aircraft seat.

Moreover, it is proposed that the 9G module is configured to be connected with the cabin floor by at least three fitting elements which are spaced apart from one another. Preferably the 9G module comprises an assembly frame via which the three fitting elements, by which the 9G module is connectable to the cabin floor, are connected to one another. The assembly frame forms a base frame of the 9G module on which the components that form the 9G module are mounted. The assembly frame of the 9G module is preferably realized by several beams to which the fitting elements are fixedly connectable. The beams of the assembly frame preferably form a base structure on which the further components of the 9G module are mounted. The assembly frame of the 9G module is realized separately from the assembly frame of the 16G module. The assembly frame of the 9G module has no connection to the assembly frame of the 16G module. This allows mounting of the 9G module on the cabin floor in an especially advantageous and secure manner.

It is furthermore proposed that the first enclosure element forms part of the separately realized 9G module. Preferably, in the implementation in which both enclosure elements are allocated to the 9G module, the first enclosure element and the second enclosure element of the enclosure unit may be fixedly connected to each other or may be realized integrally with each other. If the first enclosure element is embodied as part of the separately realized 9G module, it is advantageously possible to form the door element also as part of the 9G module. In this way the door element could also be realized in an especially advantageously lightweight manner and with reduced structural effort. As a result, the first enclosure element may be connected to the cabin floor in an especially advantageous manner, and may in particular be realized in a lightweight manner as it can be approved in the 9G crash test.

Beyond this it is proposed that the 16G module and the 9G module are realized free of a direct fixed connection. "Free of a direct fixed connection" is preferably to mean that the 16G module and the 9G module are not connected to each other directly and fixedly by means of a force-fitting or form-fitting connection or by substance-to-substance bond. Preferably, no force transmission is possible between the 16G module and the 9G module which are free of a direct connection. It is preferably conceivable that the 16G module and the 9G module have in a region of their enclosure elements a gap which is in a mounted state closed by means of an elastic element, like in particular a rubber lip, and via which no force transmission is possible between the first enclosure element, which forms part of the 16G module, and the second enclosure element, which forms part of the 9G module. This allows implementing the two modules in an especially advantageously separate manner, advantageously preventing a force transmission between the two modules.

Furthermore, it is proposed that the first enclosure element and the second enclosure element have an overlap region, in which the two enclosure elements overlap. An "overlap region" is to mean a region in which the two enclosure elements overlap, in particular in a horizontal plane. This allows a separation of the aircraft seat region by the two enclosure elements in a particularly simple and advantageous manner, without the enclosure elements being coupled directly with each other.

It is further proposed that a region between the ottoman and the aircraft seat is realized at least partly free of a pedestal. A "pedestal" is preferably to mean a component which is elevated with respect to the cabin floor and which may, for example, form a floor. "At least partly free of a pedestal" is preferably to mean that there is no pedestal arranged at least in a subregion, preferably in the entire region between the aircraft seat and the ottoman, respectively a bottom element of the front console unit. In a region that is realized free of a pedestal, in particular the cabin floor of the aircraft cabin forms a floor of the aircraft seat region. In this way the aircraft seat region may be realized so as to be especially advantageously accessible, as there is advantageously no height difference between a central aisle and a floor of the aircraft seat region.

Moreover, an aircraft cabin is proposed, with a single central aisle and with at least one aircraft seat arrangement comprising several aircraft seat modules, which is arranged between the central aisle and a first side panel, and with a second aircraft seat arrangement comprising several aircraft seat modules, which is arranged between the central aisle and a second side panel. This allows providing a particularly advantageous aircraft cabin.

It is also proposed that the aircraft seat modules of the aircraft seat arrangement have a seat distance X in a range from 838 mm (33 inches) to 1016 mm (40 inches) and in each case comprise an aircraft seat mounted at an angle α of 30 degrees to 80 degrees, preferably 45 degrees to 65 degrees, relative to an aircraft cabin middle axis. This allows providing the aircraft cabin with an especially advantageously space-saving aircraft seat arrangement.

The aircraft seat module according to the invention shall herein not be limited to the application and implementation described above. In particular, in order to fulfil a functionality that is described here, the aircraft seat module according to the invention may comprise a number of individual elements, components and units that differs from a number given here.

DRAWINGS

Further advantages will become apparent from the following description of the drawings. In the drawings two exemplary embodiments of the invention are illustrated. The drawing, the description and the claims contain a plurality of features in combination. Someone skilled in the art will purposefully also consider the features separately and will find further expedient combinations.

Figure 2:
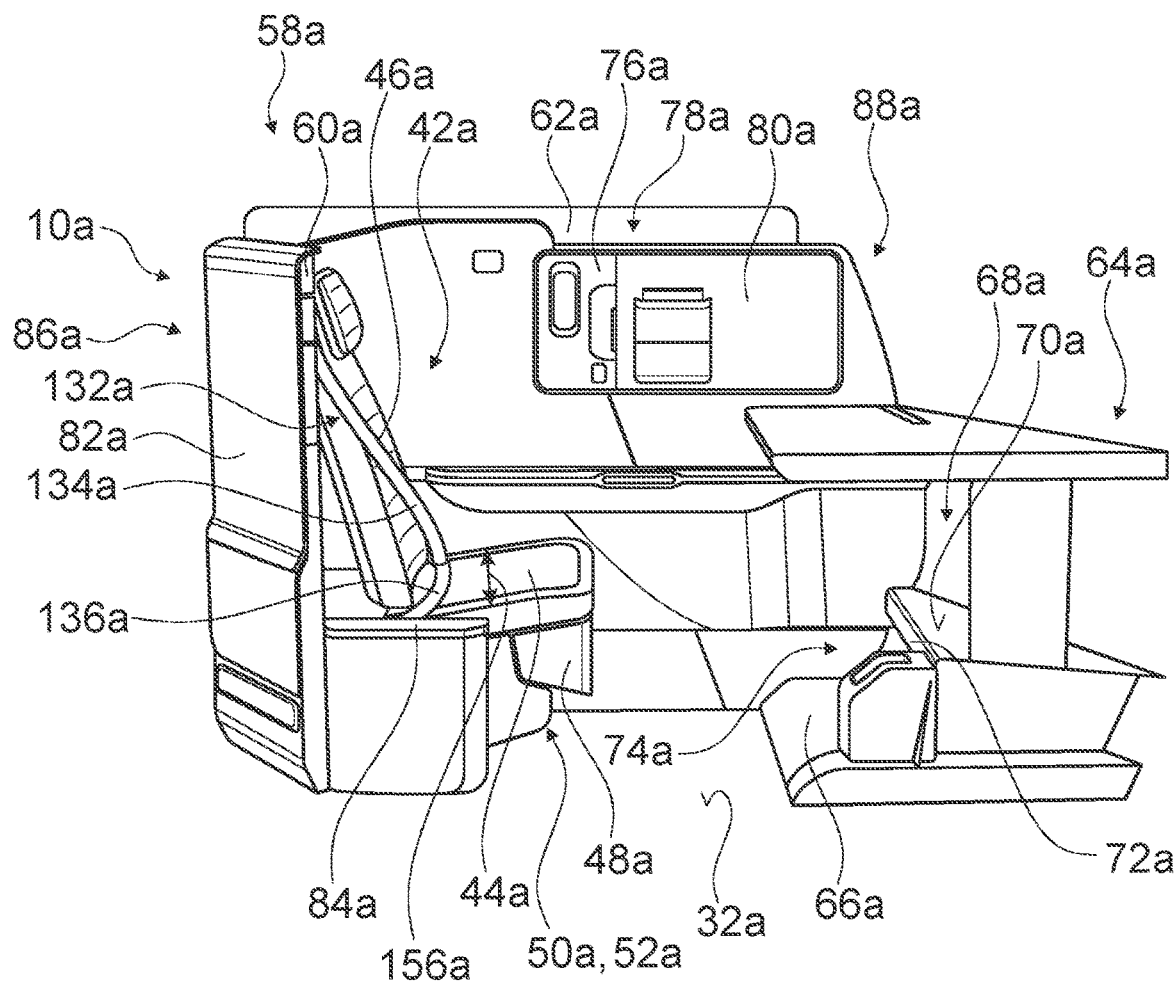
Figure 3:
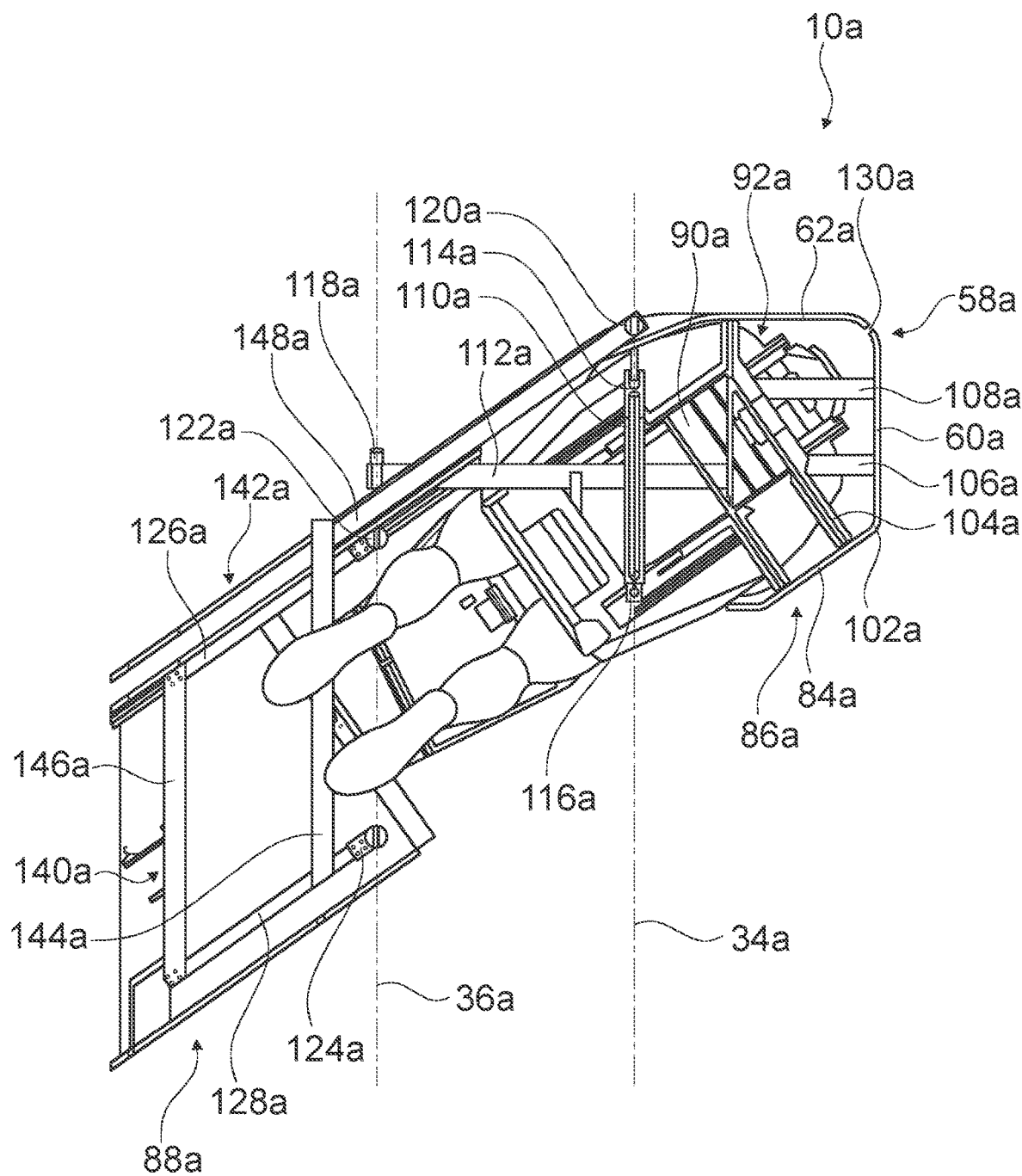
Figure 4:
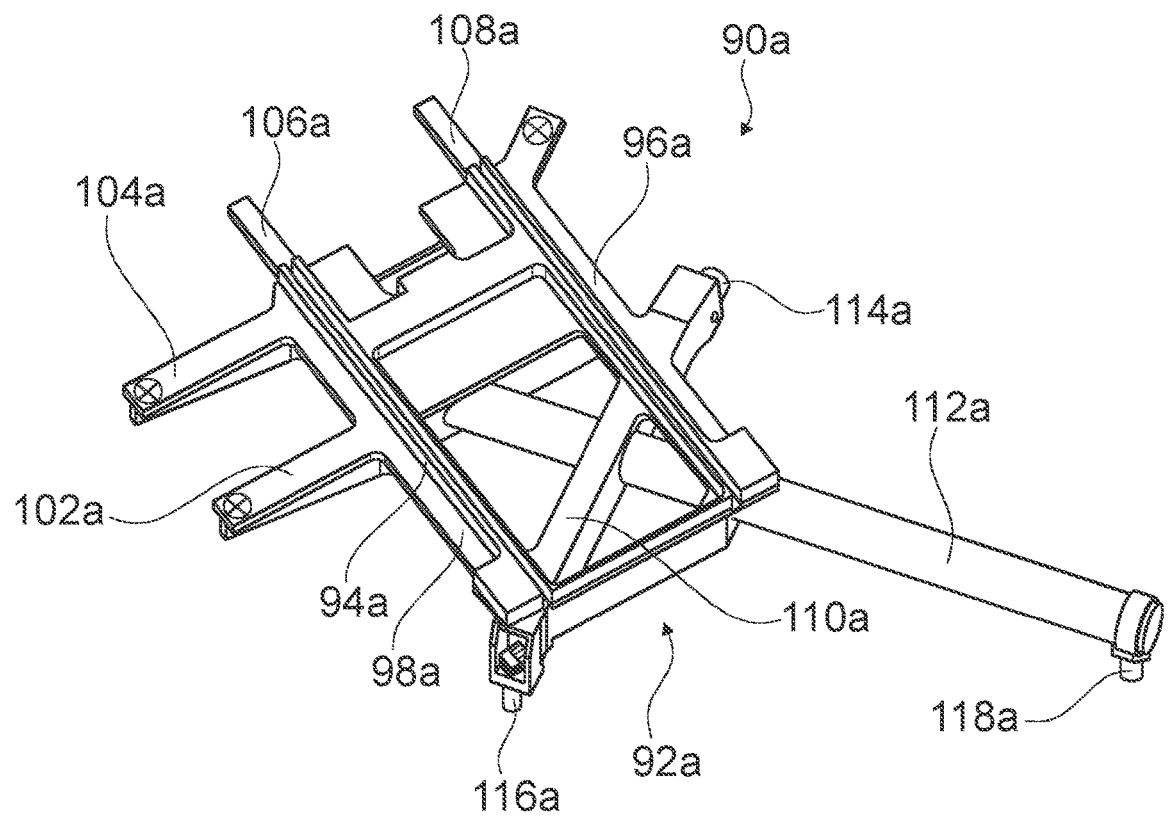
Figure 5:
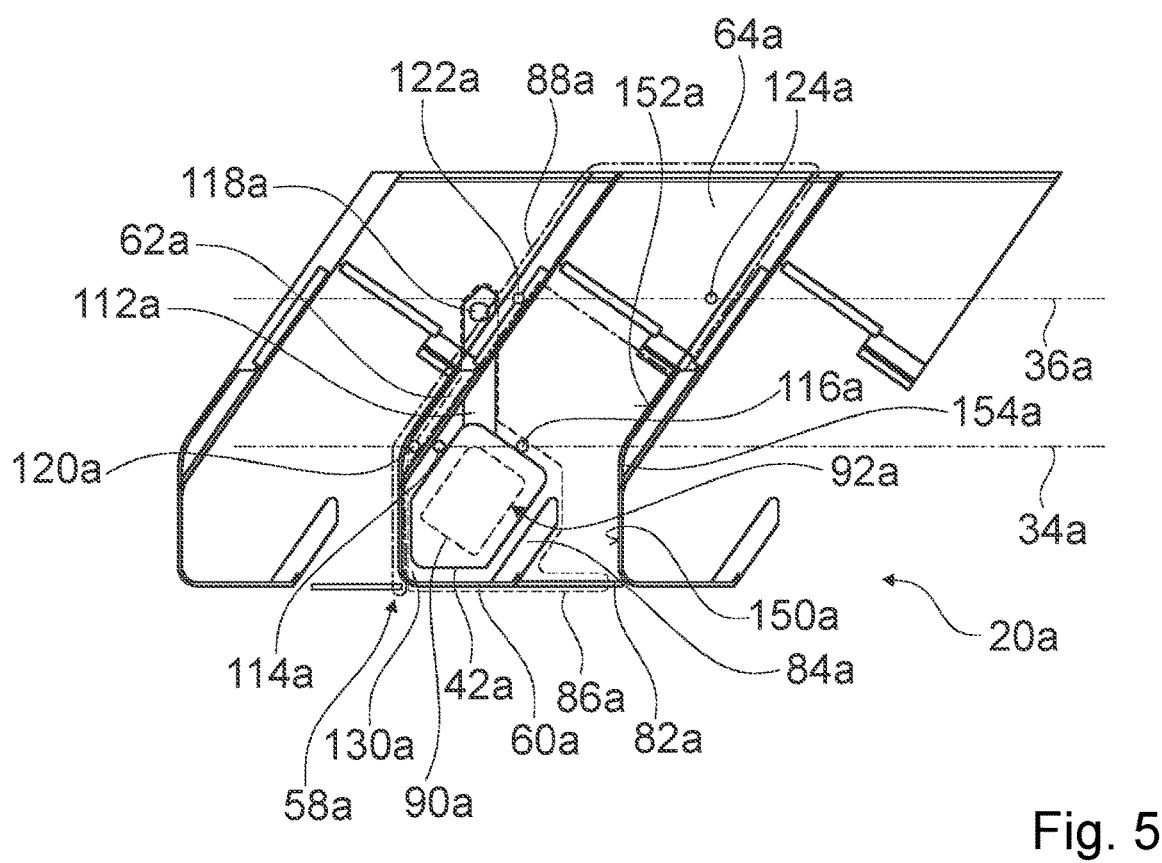

It is shown in:

FIG. 1 a schematic top view of an aircraft cabin according to the invention, with a single central aisle and with a layout of two rows of aircraft seat arrangements, which in each case comprise aircraft seat modules according to the invention, FIG. 2 a schematic view of an individual aircraft seat module from a side, FIG. 3 a schematic view from below onto the aircraft seat module and corresponding mounting points for a 16G module and a 9G module of the aircraft seat module, FIG. 4 a schematic view of an assembly frame of the 16G module, FIG. 5 a schematic top view onto several aircraft seat modules with corresponding mounting points for the 16G module and the 9G module of the aircraft seat module, and FIG. 6 a schematic top view onto several aircraft seat modules with corresponding mounting points for the 16G module and the 9G module of the aircraft seat module, in a second exemplary embodiment.

DESCRIPTION OF THE EXEMPLARY EMBODIMENTS

FIG. 1 shows a portion of an aircraft cabin according to the invention 12a. In FIG. 1 a cutout of an aircraft cabin 12a is shown. The aircraft cabin 12a has two opposite-situated side panels 14a, 16a which delimit the aircraft cabin 12a sidewise. The first side panel 14a is realized as a lefthand side panel 14a, viewed from a tail end of the aircraft cabin 12a. The second side panel 16a is realized as a righthand side panel 16a, viewed from a tail end of the aircraft cabin 12a. The aircraft cabin 12a forms an aircraft cabin middle axis 18a. The aircraft cabin middle axis 18a is arranged respectively centrally between the opposite-situated side panels 14a, 16a of the aircraft cabin 12a. The aircraft cabin middle axis 18a is realized as a longitudinal axis of the aircraft cabin 12a. The aircraft cabin middle axis 18a is aligned parallel to a mounting plane of the aircraft cabin 12a. The aircraft cabin 12a has a cabin floor 32a. The cabin floor 32a forms the mounting plane of the aircraft cabin 12a. The aircraft cabin 12a has a central aisle 20a. The central aisle 20a is realized as a single aisle. The aircraft cabin 12a has just the one central aisle 20a. The central aisle 20a is arranged centrally between the opposite-situated side panels 14a, 16a of the aircraft cabin 12a. The central aisle 20a runs coaxially with the aircraft cabin middle axis 18a of the aircraft cabin 12a. The aircraft cabin 12a comprises several fastening rails 34a, 36a, 38a, 40a. The aircraft cabin 12a comprises fastening rails 34a, 36a, 38a, 40a, wherein respectively two fastening rails 34a, 36a, 38a, 40a are realized as a pair.

Respectively two fastening rails 34a, 36a, 38a, 40a are arranged between the central aisle 20a and one of the side panels 14a, 16a. The fastening rails 34a, 36a, 38a, 40a run parallel to the aircraft cabin middle axis 18a. The fastening rails 34a, 36a, 38a, 40a are embedded in the cabin floor 32a. The fastening rails 34a, 36a and the fastening rails 38a, 40a are arranged respectively pairwise. The pairwise-arranged fastening rails 34a, 36a, 38a, 40a have, for example, a distance of 530 mm.

FIG. 1 shows two aircraft seat arrangements 22a, 24a. The aircraft cabin 12a comprises the first aircraft seat arrangement 22a and the second aircraft seat arrangement 24a. The first aircraft seat arrangement 22a is arranged on a lefthand side of the central aisle 20a. The first aircraft seat arrangement 22a is fastened in the aircraft cabin 12a via the fastening rails 34a, 36a. The first aircraft seat arrangement 22a is thus arranged between the central aisle 20a and the lefthand side panel 14a. The second aircraft seat arrangement 24a is arranged on a righthand side of the central aisle 20a. The second aircraft seat arrangement 24a is fastened in the aircraft cabin 12a via the fastening rails 38a, 40a. The second aircraft seat arrangement 24a is thus arranged between the central aisle 20a and the righthand side panel 16a. The two aircraft seat arrangements 22a, 24a are arranged on opposite-situated sides of the central aisle 20a. The two aircraft seat arrangements 22a, 24a are realized essentially identically. The two aircraft seat arrangements 22a, 24a are realized in mirror symmetry identically. The second aircraft seat arrangement 24a forms with respect to the aircraft cabin middle axis 18a a mirror image of the first aircraft seat arrangement 22a. Therefore, in the following only the first aircraft seat arrangement 22a will be described in detail. An explanation of the second aircraft seat arrangement 24a may be made on the basis of the following description of the first aircraft seat arrangement 22a.

The aircraft seat arrangement 22a comprises a first aircraft seat module 10a. The first aircraft seat module 10a delimits an aircraft seat region 26a. The aircraft seat arrangement 22a comprises a second aircraft seat module 28a. The second aircraft seat module 28a delimits a further aircraft seat region 30a. The second aircraft seat module 28a is arranged directly next to the first aircraft seat module 10a. The two aircraft seat modules 10a, 28a are arranged directly adjacent to each other. The aircraft seat arrangement 22a comprises further aircraft seat modules. The two aircraft seat modules 10a, 28a of the aircraft seat arrangement 22a are all arranged one behind the other one in a row. The aircraft seat modules 10a, 28a of the aircraft seat arrangement 22a are all embodied essentially identically. Principally it would be conceivable that individual aircraft seat modules 10a, 28a have small differences. In particular, it is conceivable that a foremost aircraft seat module of the aircraft seat modules which are arranged in a row, or a rearmost aircraft seat module of the aircraft seat modules of the aircraft seat arrangement 22a, which are arranged in a row, are realized partly differently. The phrasing "first aircraft seat module" and "second aircraft seat module" does not refer to a position in the row of aircraft seat modules but is only intended for a differentiation between the two aircraft seat modules 10a, 28a, which are arranged directly next to each other and will in the following be described in detail. In the following, only the one aircraft seat module 10a will be described in detail, wherein an explanation will also apply to the further aircraft seat modules 28a. The aircraft seat module 10a comprises an aircraft seat 42a. The aircraft seat 42a comprises a seat bottom 44a and a backrest 46a. Furthermore, the aircraft seat 42a comprises a leg support element 48a, which is arranged pivotably on a front end of the seat bottom 44a. The aircraft seat 42a comprises a base frame 50a. The base frame 50a forms a load-bearing basic frame of the aircraft seat 42a. The base frame 50a is realized as an assembly base frame of the aircraft seat 42a.

The aircraft seat 42a is realized as a full-flat seat. The aircraft seat 42a is adjustable between a TTL sitting position, that is an upright sitting position, and a lying-down position. In the lying-down position the aircraft seat 42a forms a substantially planar lying-down surface. In the lying-down position the seat bottom 44a, the backrest 46a and the foot support element 48a each form a portion of the lying-down surface of the aircraft seat 42a. It would principally also be conceivable that the aircraft seat 42a does not comprise a leg support element 48a. The aircraft seat 42a comprises a cinematics unit 52a, by means of which the aircraft seat 42a can be traversed electro-mechanically between the TTL position and the lying-down position. The aircraft seat 42a further comprises a headrest element, which is mounted in an upper region of the backrest 46a. The headrest element is preferably connected to the backrest 46a in such a way that it is adjustable in height. The seat bottom 44a forms a seat width 156a of the aircraft seat 42a. The seat width 156a of the aircraft seat 42a is realized as a width that is measured orthogonally to the central axis 54a of the aircraft seat 42a in the widest point of the aircraft seat 42a. Preferably the seat width 156a of the aircraft seat 42a is 508 mm (20 inches).

The aircraft seat 42a comprises a three-point belt unit 132a. The three-point belt unit 132a is configured for a fixing of the passenger on the aircraft seat 42a. By means of the three-point belt unit 132a, a passenger can be strapped on the aircraft seat 42a. The three-point belt unit 132a is embodied as a three-point belt. The three-point belt unit 132a comprises a shoulder strap 134a and a lap strap 136a. The lap strap 136a is configured for securing the passenger in a pelvis and hip region. The lap strap 136a is configured, in a closed state of the three-point belt unit 132a, to span across the seat bottom 44a. The lap strap 136a is configured such that in a closed state of the three-point belt unit 132a, the passenger is arranged with his pelvis and lap region between the seat bottom 44a and the lap strap 136a. The shoulder strap 134a is configured for securing the passenger's upper body at the aircraft seat 42*a*. The shoulder strap 134*a* is in particular configured, for securing the passenger at the aircraft seat 42*a*, to extend from an upper region of the backrest 46*a* transversely across a backrest surface of the backrest 46*a* to a lower end of the backrest 46*a*. In a closed state of the three-point belt unit 132*a*, the shoulder strap 134*a* extends transversely across the passenger's torso such that the passenger is secured. The shoulder strap 134*a* is arranged on a righthand side of the backrest 46*a* in an upper region. The shoulder strap 134*a* is mounted on a side of the backrest 46*a* that faces towards the central aisle 20*a*. The shoulder strap 134*a* is mounted on a side of the backrest 46*a* that faces towards a front of the aircraft cabin 12*a*.

For a connection of the three-point belt unit 132*a* to the aircraft seat 42*a*, the three-point belt unit 132*a* comprises a connection unit. The connection unit is configured to fixedly connect the three-point belt unit 132*a* to the aircraft seat 42*a* in an operationally safe manner. The connection unit has a first connection point, in which the lap strap 136*a* is connected to the base frame 50*a* of the aircraft seat 42*a* with a first end. Via a second connection point, the lap strap 136*a* is connected to the base frame 50*a* of the aircraft seat 42*a* with its second end. The three-point belt unit 132*a* has a belt lock (not shown in detail), by which the lap strap 136*a* can be opened. In a closed state the lap strap 136*a* is closed by means of the belt lock. A third connection point of the three-point belt unit 132*a* is arranged in an upper region of the backrest 46*a*. Via the third connection point, the shoulder strap 134*a* is fixedly connected to a load-bearing structure of the backrest 46*a*. The shoulder strap 134*a* is configured, for a closing of the three-point belt unit 132*a*, to be coupled with the belt lock that is connected to the lap strap 136*a*. For this purpose the shoulder strap 134*a* has on its loose end a coupling element, which can be coupled in a form-fitting manner with a form-fitting element of the belt lock. The three-point belt unit 132*a* comprises a belt-tightening unit, which is integrated in the third connection point of the shoulder strap 134*a*. The belt-tightening unit is configured for tensioning the shoulder strap 134*a*, in particular in case of a crash. By means of the three-point belt unit 132*a*, a passenger sitting on the aircraft seat 42*a* can be secured in a particularly advantageous manner as in case of a crash or in a crash test a twisting of a passenger's torso or of a crash test dummy's torso can be minimized, respectively advantageously prevented. It is in particular advantageously possible that a twisting of the passenger's shoulder region is prevented by the three-point belt unit 132*a*. Principally it is also conceivable that the three-point belt unit 132*a* has a different implementation, deemed expedient by someone skilled in the art, in particular comprising a different belt lock or different connection positions on the aircraft seat 42*a*.

The aircraft seat 42*a* is configured to be mounted in the aircraft cabin 12*a* at an angle $\alpha$ of more than 30 degrees to 80 degrees. Preferably the aircraft seat 42*a* is mounted in the aircraft cabin 12*a* at an angle $\alpha$ of 35 degrees to 80 degrees. In the exemplary embodiment shown, the aircraft seat 42*a* is mounted in the aircraft cabin 12*a* at an angle $\alpha$ of 55 degrees. The aircraft seat 42*a* forms a longitudinally-extending central axis 54*a*. The central axis 54*a* divides the aircraft seat 42*a* centrally. The longitudinally-extending central axis 54*a* runs parallel to a mounting plane of the aircraft seat 42*a*. The angle $\alpha$, at which the aircraft seat 42*a* is mounted in the aircraft cabin 12*a*, is measured between the aircraft cabin middle axis 18*a* and the longitudinally-extending central axis 54*a* of the aircraft seat. The aircraft seat 42*a* is mounted such that it is rotated by the angle $\alpha$ relative to the aircraft cabin middle axis 18*a*.

The aircraft seat 42*a* has a sitting direction 56*a*. The sitting direction 56*a* runs parallel to the longitudinally-extending central axis 54*a* of the aircraft seat 42*a*. The sitting direction 56*a* runs substantially parallel to the cabin floor 32*a* and, in the TTL position of the aircraft seat 42*a*, is substantially perpendicular to a backrest surface formed by the backrest 46*a*. The sitting direction 56*a* is directed away from the backrest surface of the backrest 46*a*. The sitting direction 56*a* is realized as a direction in which a passenger is oriented when sitting on the aircraft seat 42*a* in a regular manner. The aircraft seat 42*a* is in the mounted state directed away from the central aisle 20*a* of the aircraft cabin 12*a*. The sitting direction 56*a* of the aircraft seat 42*a* points away from the central aisle 20*a* towards the side panel 14*a*.

The aircraft seat modules 10*a*, 28*a* of the aircraft seat arrangement 22*a* are arranged in the aircraft cabin 12*a* at a seat distance X (pitch) relative to each other. Preferably, all the aircraft seat modules 10*a*, 28*a* of the aircraft seat arrangement 22*a* in each case have the same seat distance to the respectively directly neighboring aircraft seat module 10*a*, 28*a* of the aircraft seat arrangement 22*a*. The seat distance X is a distance, measured parallel to the aircraft cabin middle axis 18*a*, between the neighboring aircraft seat modules 10*a*, 28*a*, in particular between corresponding same components of the two aircraft seat modules 10*a*, 28*a*. By way of example, the seat distance between the two aircraft seat modules 10*a*, 28*a*, between the aircraft seats of the respectively neighboring aircraft seat modules, is illustrated as a seat distance X. The seat distance X is a distance, measured parallel to the aircraft cabin middle axis 18*a*, between the aircraft seat center points of the respective aircraft seats of the aircraft seat modules. The seat distance X between the neighboring aircraft seat modules 10*a*, 28*a* may preferably be in a range between 838 mm (33 inches) and 1016 mm (40 inches). Preferably the aircraft seat modules 10*a*, 28*a* of the aircraft seat arrangement 22*a* have a seat distance X of 989 mm (35 inches). This short seat distance X is achievable in particular by the strong inclination of the aircraft seats 42*a* by the angle $\alpha$ of 30 degrees to 80 degrees.

The aircraft seat 42*a*, realized as a full-flat seat, of the aircraft seat module 10*a* forms in its lying-down position an especially comfortable long lying-down surface. The lying-down surface of the aircraft seat in its lying-down position has a lying-down surface length of 2006 mm (79 inches). It is principally conceivable that the aircraft seats have in their lying-down position a lying-down surface length of 1905 mm (75 inches) to 2032 mm (80 inches), depending on the angle $\alpha$ by which the aircraft seats 42*a* of the aircraft seat modules 10*a*, 28*a* are oriented in the aircraft cabin 12*a*. With an angle $\alpha$ of 65 degrees a lying-down surface length of 2006 mm (79 inches) is achievable with a seat distance X of 989 mm (35 inches). As a result, with a favorable packing density of the aircraft seat modules 10*a*, 28*a*, due to a short seat distance X, because of 2 the aircraft seats 42*a* being arranged obliquely by the angle $\alpha$, an especially advantageously long lying-down surface length is achievable. This allows implementing the aircraft seat module 10*a*, 28*a* in a particularly comfortable manner.

The aircraft seat module 10*a* comprises an enclosure unit 58*a*. The enclosure unit 58*a* is configured to at least partly delimit the aircraft seat region 26*a* of the first aircraft seat module 10*a*. The enclosure unit 58*a* delimits the aircraft seat region 26*a* of the aircraft seat module 10*a* in a region of the aircraft seat 42a. The enclosure unit 58a delimits the aircraft seat region 26a in a region behind the aircraft seat 42a. The enclosure unit 58a delimits the aircraft seat region 26a in a region sideways and in front of the aircraft seat 42a. The enclosure unit 58a comprises a first enclosure element 60a. The first enclosure element 60a is configured to at least partly delimit the aircraft seat region 26a of the aircraft seat module 10a. The first enclosure element 60a is arranged substantially behind the aircraft seat 42a. The first enclosure element 60a separates the aircraft seat region 26a from the central aisle 20a of the aircraft cabin 12a. The first enclosure element 60a is embodied as a wall element. The first enclosure element 60a extends in a mounted state from the cabin floor 32a as far as into a region above the backrest 46a in a TTL position of the aircraft seat 42a. The first enclosure element 60a is, for example, made of plastic or plastic-composite plates.

The enclosure unit 58a comprises a second enclosure element 62a. The second enclosure element 62a is configured to at least partly delimit the aircraft seat region 26a of the aircraft seat module 10a. The second enclosure element 62a delimits the aircraft seat region 26a of the aircraft seat module 10a in a region sideways of the aircraft seat 42a. The second enclosure element 62a is arranged substantially sideways and in front of the aircraft seat 42a. The second enclosure element 62a separates the aircraft seat 26a from the sideways neighboring aircraft seat region 30a of the aircraft seat module 28a. The second enclosure element 62a is realized as a wall element. The second enclosure element 62a extends in a mounted state from the cabin floor 32a as far as into a region above the backrest 46a in a TTL position of the aircraft seat 42a. The second enclosure element 62a is made, for example, of plastic or plastic-composite plates. The second enclosure element 62a extends sideways of the aircraft seat 42a. The second enclosure element 62a extends from the aircraft seat 42a towards the side panel 14a. The second enclosure element 62a delimits the aircraft seat region 26a of the first aircraft seat module 10a sideways towards a first lefthand side in the region of the aircraft seat 42a and in the region in front of the aircraft seat 42a. The second enclosure element 62a extends in a region in front of the aircraft seat 42a parallel to a sitting direction 56a of the aircraft seat 42a. The second enclosure element 62a has a front subregion, which is aligned parallel to a sitting direction 56a of the aircraft seat 42a. The second enclosure element 62a extends, with the end that is distant from the aisle, as far as shortly in front of the side panel 14a. The second enclosure element 62a has a rear subregion, in which the second enclosure element 62a is realized so as to be curved relative to the front subregion. The rear subregion of the second enclosure element 62a is arranged in the region of the aircraft seat 42a. The rear subregion of the second enclosure element 62a is curved towards the aircraft seat 42a and extends as far as into a region behind the aircraft seat 42a. The front subregion and the rear subregion of the second enclosure element 62a are preferably realized integrally. Principally a multi-part implementation of the second enclosure element 62a of several interconnected individual elements would also be conceivable.

The aircraft seat module 10a comprises a console unit 64a. The console unit 64a is arranged frontally in front of the aircraft seat 42a. The console unit 64a is connected with the enclosure unit 58a of the aircraft seat module 10a. The console unit 64a is mounted on the second enclosure element 62a of the enclosure unit 58a. The console unit 64a has a base frame, which is not shown in detail. The console unit 64a is connected to the cabin floor 32a via said base frame.

The console unit 64a comprises a bottom element 66a. The bottom element 66a forms a base bottom of the console unit 64a. The bottom element 66a is embodied as a lining element, which surrounds the base frame of the console unit 64a. The bottom element 66a covers the base frame of the console unit 64a. The aircraft seat module 10a comprises an ottoman 68a. The ottoman 68a provides a footrest region 70a. The ottoman 68a is implemented by the console unit 64a. The footrest region 70a is embodied by a rigid support element 72a. The rigid support element 72a forms a surface that is elevated with respect to the mounting plane. The support element 72a that forms the footrest region 70a, is arranged above the bottom element 66a. There is an interstice between the support element 72a that forms the footrest region 70a and the bottom element 66a. The interstice between the bottom element 66a and the support element 72a is preferably realized as a stowage and/or depositing region 74a, in particular for carry-on baggage. Preferably, fastening means, for example a net element or a tensioning element for securing carry-on baggage, are provided n the stowage and/or depositing region 74a between the bottom element 66a and the support element 72a. The footrest region 70a augments the lying-down surface provided by the aircraft seat 42a in the lying-down position. In the lying-down position of the aircraft seat 42a, the aircraft seat 42a, that is the backrest 46a, the seat bottom 44a, the leg support element 48a and the rigid support element 72a that forms the footrest region 70a, form the planar lying-down surface. A region between the ottoman 68a and the aircraft seat 42a is realized at least partly free of a pedestal. Preferably the region between the bottom element 66a of the front console unit 64a and the aircraft seat 42a is realized free of a pedestal. In the region between the aircraft seat 42a and the bottom element 66a of the front console unit 64a, the cabin floor 32a forms a floor of the aircraft seat region 26a. In this way a planar floor can be created from the central aisle 20a as far as into a region between the aircraft seat 42a and the console unit 64a of the aircraft seat region 26a. In particular, there is no step between the central aisle 20a and the region between the aircraft seat 42a and the console unit 64a of the aircraft seat region 26a.

The aircraft seat module 10a comprises a second console unit 76a. The console unit 76a is attached on an inner side of the enclosure unit 58a of the aircraft seat module 10a, on the second enclosure element 62a. The console unit 76a is arranged in a region in front of the aircraft seat 42a. The console unit 76a forms a stowage facility 78a. The stowage facility 78a is configured to accommodate a variety of utensils. It is possible to stow different utensils in the stowage facility 78a in a loss-proof manner, in particular during a flight. The aircraft seat module 10a comprises a monitor unit 80a. The monitor unit 80a is pivotably connected to the inner side of the second enclosure element 62a. The monitor unit 80a is mounted in a front region of the enclosure unit 58a. The monitor unit 80a is mounted at a front region of the second console unit 76a. Advantageously the monitor unit 80a is integrated in the second console unit 76a.

The aircraft seat module 10a may comprise a door element 82a. The door element 82a is arranged so as to be displaceable on the first enclosure element 60a of the enclosure unit 58a. The door element 82a is supported via a bearing unit, which is not shown in detail, so as to be linearly displaceable on the first enclosure element 60a. The door element 82a can be adjusted between an open position and a closed position. In the open position the door element 82a is arranged in the first enclosure element 60a of the enclosure unit 58a. In the open position the door element 82a leaves the passage region to the aircraft seat region 26a free. The passage region of the aircraft seat region 26a has a width of 381 mm (15 inches). In the closed position the door element 82a has been moved out of the first enclosure element 60a. In the closed position the door element 82a closes the passage region to the aircraft seat region 26a of the aircraft seat module 10a. It is principally also conceivable that the aircraft seat module 10a does not comprise a door element 82a, such that a passage region to the aircraft seat region 26a remains free permanently. Principally it is also conceivable that the door element 82a, which is supported displaceably on the second enclosure element 62a of the enclosure unit 58a, is configured to close a passage region to an aircraft seat region arranged next to the aircraft seat module 10a, in particular behind the aircraft seat module 10a. For this it would be conceivable that the movably supported door element 82a is supported in such a way that it is displaceable, from the second enclosure element 60a, in a direction away from the aircraft seat module arranged in front of the aircraft seat module 10a towards the aircraft seat module arranged behind the aircraft seat module 10a.

The aircraft seat module 10a comprises a first armrest element 84a. The first armrest element 84a is arranged sideways of the aircraft seat 42a. The first armrest element 84a is arranged next to the seat bottom 44a, on a side of the aircraft seat 42a that faces towards the passage region. The armrest element 84a is connected in a displaceable manner with the first enclosure element 60a of the enclosure unit 58a. The armrest element 84a is preferably adjustable in height via a bearing unit. Preferably the first armrest element 84a is also adjustable in its horizontal position. On a side situated opposite the first armrest element 84a, the aircraft seat module 10a may preferably comprise a further armrest element, which is mounted on the aircraft seat 42a or on the enclosure unit 58a.

The aircraft seat module 10a is composed of two separately realized modules 86a,88a. The aircraft seat module 10a is implemented by a 16G module 86a and a 9G module 88a. The 16G module 86a and the 9G module 88a are realized separately from each other. Several components of the aircraft seat module 10a respectively form the 9G module 88a, respectively the 16G module 86a. The 16G module 86a is configured for an approval by way of a 16G crash test. To comply with the current approval conditions for an approval in the field of aircraft, the 16G module 86a must pass a 16G crash test. In a 16G crash test the 16G module 86a is decelerated or accelerated with an acceleration of 16 g, that is sixteen times the gravitational acceleration. The 9G module 88a is configured for an approval by way of a 9G crash test. To comply with the current approval conditions for an approval in the field of aircraft, the 9G module 88a must pass a 9G crash test. In a 9G crash test the 9G module 88a is decelerated or accelerated with an acceleration of 9 g, that is nine times the gravitational acceleration.

The 16G module 86a comprises the aircraft seat 42a. The aircraft seat 42a forms with its base frame 50a, its cinematics unit 52a as well as with the seat bottom 44a, the backrest 46a and the leg support element 48a a portion of the 16G module 86a. The aircraft seat 42a forms with all its add-on components a portion of the 16G module 86a. The 16G module 86a comprises the first enclosure element 60a of the enclosure unit 58a. The aircraft seat 42a and the first enclosure element 60a of the enclosure unit 58a are combined in the separately realized 16G module 86a. The 16G module 86a further comprises the door element 82a, which is connected with the first enclosure element 62a of the enclosure unit 58a. The door element 82a forms part of the 16G module 86a. The 16G module 86a further comprises the armrest element 84a. The armrest element 84a forms part of the 16G module 86a. The aircraft seat 42a, the first enclosure element 60a of the enclosure unit 58a, the door element 86a and the armrest element 84a are together combined to form the separately realized 16G module 86a. Principally it would also be conceivable that the 16G module 86a comprises further components of the aircraft seat module 10a. The 16G module 86a forms an assembly group.

The 16G module 86a comprises an assembly frame 90a. The assembly frame 90a is configured for a connection to the cabin floor 32a. The assembly frame 90a is configured to connect the 16G module 86a to the cabin floor 32a. Via the assembly frame 90a the 16G module 86a is coupled to the fastening rails 34a, 36a. All the parts of the 16G module 86a are fastened on the assembly frame 90a. The assembly frame 90a has a main assembly region 92a. The main assembly region 92a is configured for the aircraft seat 42a to be connected thereon. The main assembly region 92a is realized so as to be substantially rectangular. The main assembly region 92a forms a main platform of the assembly frame 90a. The main assembly region 92a comprises two guide rails 94a, 96a. The guide rails 94a, 96a are configured for a connection of the aircraft seat 42a. The guide rails 94a, 96a are embodied as sliding rails. The guide rails 94a, 96a extend in a mounted state substantially parallel to the cabin floor 32a. Principally it is also conceivable that the guide rails 94a, 96a are in the mounted state oriented with an inclination relative to the cabin floor 32a. The guide rails 94a, 96a extend parallel to the central axis 54a of the aircraft seat 42a. The guide rails 94a, 96a are configured for a connection of the base frame 50a of the aircraft seat 42a. The aircraft seat 42a is supported so as to displaceable with its base frame 50a on the guide rails 94a, 96a, and thus to be displaceable on the assembly frame 90a. Via the cinematics unit 52a, the base frame 50a and thus the aircraft seat 42a is movable relative to the assembly frame 90a. The main assembly region 92a preferably comprises two parallel-extending beams 98a, 100a. The beams 98a, 100a extend substantially parallel to the central axis 54a of the aircraft seat 42a. The beams 98a, 100a are preferably connected to one another via several transverse struts. The beams 98a, 100a and the transverse struts form a base structure of the main assembly region 92a. The guide rails 94a, 96a are connected on an upper side of the beams 98a, 100a. Advantageously the guide rails 94a, 96a are realized integrally with the beams 98a, 100a. It is principally also conceivable that the guide rails 94a, 96a are connected on an upper side of the beams 98a, 100a in a form-fitting and/or force-fitting manner, for example by screwing. The main assembly region 92a comprises two holding webs 102a, 104a extending on the righthand side of the main assembly region 92a, away from the righthand beam 98a. The holding webs 102a, 104a are oriented at an angle of 90 degrees relative to the beam 98a of the main assembly region 92a. The holding webs 102a, 104a are configured for a connection of the armrest element 84a. The holding webs 102a, 104a have, in a region that is at a distanced from the beam 98a, a mounting point for the armrest element 84a. Via the holding webs 102a, 104a and the corresponding mounting points, the armrest element 84a is fixedly connected with the assembly frame 90a. The main assembly region 92a comprises two further holding webs 106a, 108a. The holding webs 106a.

108a extend from the main assembly region 92a into a region behind the aircraft seat 42a. The two further holding webs 106a, 108a are configured for a connection of the first enclosure element 60a of the enclosure unit 58a. The two further holding webs 106a, 108a in each case have, in a region that is distant from the main assembly region 92a, a mounting point for the first enclosure element 60a of the enclosure unit 58a. Via the holding webs 106a, 108a and the corresponding mounting points, the first enclosure element 60a of the enclosure unit 58a is fixedly connected with the assembly frame 90a. The assembly frame 90a comprises a connecting beam 110a. The connecting beam 110a is configured for a coupling with the fastening rail 34a of the aircraft cabin 12a. The connecting beam 110a is arranged in a region of the main assembly region 92a. The connecting beam 110a is part of the main assembly region 92a. The connecting beam 110a is arranged underneath, i. e. on an underside of, the beams 98a, 100a. The connecting beam 110a extends obliquely to the beams 98a, 100a. The connecting beam 110a includes with the beams 98a, 100a in each case the angle α by which the aircraft seat 42a is rotated and then mounted in the aircraft cabin 12a. The beams 98a, 100a, the holding webs 102a, 104a, 106a, 108a and the connecting beam 110a of the main assembly region 92a are preferably realized integrally with one another. The main assembly region 92a is preferably made of a metal, like for example an aluminum or magnesium. Principally it is also conceivable that the beams 98a, 100a, the holding webs 102a, 104a, 106a, 108a and the connecting beam 110a are realized at least partly as separate individual components, which are in a mounted state connected to one another in force-fitting and/or form-fitting manner.

The assembly frame 90a has a beam 112a, which extends away from the main assembly region 92a. The beam 112a extends obliquely away from the main assembly region 92a of the assembly frame 90a. The beam 112a is oriented at an angle of 90 degrees relative to the connecting beam 110a of the main assembly region 92a. Principally it is also conceivable that the beam 112a is oriented at a different angle relative to the connecting beam 110a. The beam 112a is realized as a mounting beam. The beam 112a is realized in the shape of a tube. The beam 112a has a circular-annulus-shaped cross section. It is principally also conceivable that the beam 112a has a different cross section. Preferably the beam 112a is fixedly connected to the main assembly region 92a. Preferably the beam 112a is connected to the main assembly region 92a of the assembly frame 90a by force-fit connection, by form-fit connection or by substance-to-substance bond. Preferably the beam 112a is fixedly screwed with the main assembly region 92a of the assembly frame 90a. Principally it is also conceivable that the beam 112a is realized integrally with the main assembly region 92a of the assembly frame 90a. The beam 112a is preferably configured to bridge a region between the two fastening rails 34a, 36a of the aircraft cabin 32a. The beam 112a is configured to bridge the region between the fastening rails 34a, 36a such that the aircraft seat 42a, which is arranged substantially above the one fastening rail 34a, can be connected to the cabin floor 32a via both fastening rails 34a, 36a. The beam 112a preferably has a length of more than 500 mm.

The 16G module is configured to be fixedly coupled with the cabin floor 32a via three mounting points. The assembly frame 90a comprises three fitting elements 114a, 116a, 118a. The three fitting elements 114a, 116a, 118a respectively form a mounting point for the 16G module 86a. The fitting elements 114a, 116a, 118a are configured for a connection to one of the fastening rails 34a, 36a. The assembly frame 90a is connected to the fastening rails 34a, 36a via exactly the three fitting elements 114a, 116a, 118a and is thus mounted on the cabin floor 32a. Two of the fitting elements 114a, 116a are arranged in the main assembly region 92a. The two fitting elements 114a, 116a arranged in the main assembly region 92a are configured for a connection to the same fastening rail 34a. In a mounted state, the two fitting elements 114a, 116a are fixed in the fastening rail 34a. The fitting elements 114a, 116a in the main assembly region 92a are fastened to the connecting beam 110a. The fitting elements 114a, 116a are in each case connected to an end of the connecting beam 110a. Via the fitting elements 114a, 116a the assembly frame 90a is mounted with its main assembly region 92a on the one fastening rail 34a.

The third fitting element 118a is connected to the beam 112a that extends away from the main assembly region 92a. The third fitting element 118a for a connection to the assembly frame 90a is connected to an end of the beam 112a that is distant from the main assembly region 92a. The third fitting element 118a, which is connected to the beam 112a, is configured for a connection to the other fastening rail 36a. The third fitting element 118a, which is connected to the beam 112a, is arranged on the other fastening rail 36a than the fitting elements 114a, 116a of the main assembly region 92a. Via the third fitting element 118a, the assembly frame 90a is mounted, with its beam that extends away from the main assembly region 92a, on the other fastening rail 36a.

The 9G module 88a comprises the console unit 64a. The 9G module 88a comprises the ottoman 68a. The console unit 64a forms with its support element 72a which forms the footrest region 70a, with its bottom element and with the stowage and depositing region 74a a portion of the 9G module 88a. The 9G module comprises the second enclosure element 62a of the enclosure unit 58a. The console unit 64a with the ottoman 68a and the second enclosure element 62a of the enclosure unit 58a are combined in the separately realized 9G module 88a. The 9G module 88a comprises the console unit 76a, which is connected to the second enclosure element 62a of the enclosure unit 58a. The 9G module 88a comprises the monitor unit 80a, which is connected to the second enclosure element 62a of the enclosure unit 58a. The console unit 76a, which is connected to the second enclosure element 62a, forms part of the 9G module 88a. The monitor unit 80a forms part of the 9G module 88a. The first console unit 64a with the ottoman 68a, the second enclosure element 62a of the enclosure unit 58a with the further console unit 76a that is fastened thereon and the monitor unit 80a are together combined to form the separately realized 9G module 88a. It would principally also be conceivable that the 9G module 88a comprises further components of the aircraft seat module 10a. The 9G module 88a forms an assembly group.

The 9G module 88a is configured to be fixedly coupled with the cabin floor 32a via three mounting points. The 9G module 88a comprises three fitting elements 120a, 122a, 124a, which are arranged spaced apart from one another. The three fitting elements 120a, 122a, 124a respectively form a mounting point for the 9G module 88a. By way of the three fitting elements 120a, 122a, 124a, the 9G module 88a is configured to be connected to the cabin floor 32a. The 9G module 88a comprises an assembly frame 140a. The assembly frame 140a forms a base frame of the 9G module 88a. The assembly frame 140a comprises a first beam 126a. The first beam 126a is realized as an elongate beam. The assembly frame 140a comprises a second beam 128a. The second beam 128a is realized as an elongate beam. The assembly frame 140a comprises two transverse beams 144a, 146a, which connect the two first beams 126a, 128a of the assembly frame 140a to one another. The beams 126a, 128a and the transverse beams 144a, 146a are respectively connected to each other rigidly, for example via screw connections. Principally it would also be conceivable that the beams 126a, 128a and the transverse beams 144a, 146a are connected to one another by substance-to-substance bond. The assembly frame 140a comprises a main assembly region 142a. The beams 126a, 128a and the transverse beams 144a, 146a form the main assembly region 142a. At least the front console unit 64a and the second enclosure element 62a of the enclosure unit 58a are mounted in the main assembly region 142a. The main assembly region 142a of the assembly frame 140a is configured for a connection of the console unit 64a. The console unit 64a is on its lefthand side fixedly mounted with its base frame on the beam 126a of the assembly frame 140a.

The assembly frame 140a of the 9G module 88a comprises a further beam 148a, which extends away from the main assembly region 142a. The beam 148a that extends away from the main assembly region 142a of the assembly frame 140a extends toward the aircraft seat 42a. The beam 148a that extends away from the main assembly region 142a of the assembly frame 140a is configured for a connection of the second enclosure element 62a of the enclosure unit 58a and for a coupling with the one fastening rail 34a.

Herein the beam 148a that extends away from the main assembly region 142a of the assembly frame 140a may intersect with part of the assembly frame 140a of the 16G module 86a. The beam 148a that extends away from the main assembly region 142a of the assembly frame 140a is herein not in contact with the assembly frame 90a of the 16G module 86a.

The first fitting element 120a is configured to be fixed in the fastening rail 34a. The first fitting element 120a is arranged on an end of the beam 148a that extends away from the main assembly region 142a of the assembly frame 140a, said end facing away from the main assembly region 142a of the assembly frame 140a. The first fitting element 120a is fixedly connected with the beam 148a. The first fitting element 120a is arranged in a region next to the aircraft seat 42a. The first fitting element 120a couples the second enclosure element 62a of the enclosure unit 58a via the assembly frame 140a with the fastening rail 34a in the rear subregion of the second enclosure element 62a. The second fitting element 122a is configured to connect the assembly frame 140a in its main assembly region 142a to the cabin floor 32a, in particular to the fastening rail 36a. The second fitting element 122a is configured to be fixed in the fastening rail 36a. The second fitting element 122a is arranged in a region in front of the aircraft seat 42a, in particular in the region between the aircraft seat 42a and the front console unit 64a. The second fitting element 122a is fixedly connected with the beam 126a of the assembly frame 140a. The fitting element 122a is fastened on a first end of the beam 126a. Via the fitting element 122a, the beam 126a of the assembly frame 140a is firmly fixed in the fastening rail 36a, i. e. firmly mounted on the cabin floor 32a. The beam 126a is configured for coupling the second enclosure element 62a of the enclosure unit 58a with the fastening rail 36a. Via the beam 126a, the second enclosure element 62a of the enclosure unit 58a is fastened on the cabin floor 32a. The second enclosure element 62a of the enclosure unit 58a is fixedly mounted on the beam 126a.

The third fitting element 124a is configured to connect the front console unit 64a to the cabin floor 32a. The third fitting element 124a is configured to be fixed in the fastening rail 36a. The third fitting element 124a is arranged in a region in front of the aircraft seat 42a, in particular in a region below the front console unit 64a. The third fitting element 124a couples the assembly frame 140a in its main assembly region 142a with the fastening rail 36a. The third fitting element 124a is fixedly connected with the beam 128a. The third fitting element 124a is fastened on a first end of the beam 128a. Via the third fitting element 124a the beam 128a, and thus the assembly frame 140a, is firmly fixed in the fastening rail 36a, i. e. firmly mounted on the cabin floor 32a.

The 16G module 86a and the 9G module 88a are configured to be fastened on the cabin floor 32a separately from each other. The 16G module 86a is via its three fitting elements 114a, 116a, 118a fastened on the cabin floor 32a separately from the 9G module 88a, which is fastened on the fastening rails 34a, 36a of the cabin floor 32a via its three fitting elements 120a, 122a, 124a. Two fitting elements 114a, 116a of the 16G module 86a and two fitting elements 122a, 124a of the 9G module 88a are respectively connected to the same fastening rail 34a, 36a. The other fitting element 118a of the 16G module 86a and the other fitting element 120a of the 9G module 88a are in each case connected to the respective other fastening rail 34a, 36a. The 16G module 86a is with its two fitting elements 114a, 116a fixed on the same fastening rail 34a, on which the 9G module 88a is fixed with its one fitting element 120a. The 9G module 88a is with its two fitting elements 122a, 124a fixed on the same fastening rail 36a on which the 16G module 86a is fixed with its one fitting element 118a. The 16G module 86a is connected to the two fastening rails 34a, 36a via its three fitting elements 114a, 116a, 118a. The 9G module 88a is connected to the two fastening rails 34a, 36a via its three fitting elements 120a, 122a, 124a. The 16G module 86a and the 9G module 88a are separately from each other connected to the fastening rails 34a, 36a via their respective fitting elements 114a, 116a, 118a, 120a, 122a, 124a. The 16G module 86a and the 9G module 88a are fixed on the fastening rails 34a, 36a independently, in particular separately, from each other via their respective fitting elements 114a, 116a, 118a, 120a, 122a, 124a.

The 16G module 86a and the 9G module 88a are realized free of a direct connection. The 16G module 86a and the 9G module 88a are not connected to each other directly. The 16G module 86a and the 9G module 88a have no force-transmitting connection between them. There is no force-transmitting connection between the modules 86a, 88a which are realized as assembly modules. There is a gap in a region in which the first enclosure element 60a of the enclosure unit 58a, which is part of the 9G module 88a, and the second enclosure element 62a of the enclosure unit 58a, which is part of the 16G module 86a, meet-such that the two enclosure elements 60a, 62a have no direct contact. The first enclosure element 60a of the enclosure unit 58a, which is part of the 9G module 88a, and the second enclosure element 62a of the enclosure unit 58a, which is part of the 16G module 86a, are not connected to each other directly. The gap between the first enclosure element 60a of the enclosure unit 58a, which is part of the 9G module 88a, and the second enclosure element 62a of the enclosure unit 58a, which is part of the 16G module 86a, is larger than a dimension by which the enclosure element 60a of the enclosure unit 58a, which is part of the 9G module 88a, gets deformed in a 9G crash test. The gap between the first enclosure element 60a and the second enclosure element 62a is bridged by an intermediate element 130a. The intermediate element 130a is realized as an elastic element. The intermediate element 130a is preferably realized as a rubber sealing lip. The intermediate element 130a, preferably completely, closes the gap between the two enclosure elements 60a, 62a of the enclosure unit 58a. The intermediate element 130a is preferably fixedly connected only with one of the enclosure elements 60a, 62a of the enclosure unit 58a. The elastic intermediate element 130a preferably only abuts the other enclosure element 60a, 62a. No force can be transmitted between the enclosure elements 60a, 62a via the intermediate element 130a. It is principally also conceivable that the two enclosure elements 60a, 62a of the enclosure unit 58a have an overlap region in which the two enclosure elements 60a, 62a overlap. Herein the enclosure elements 60a, 62a are not connected to each other in the overlap region. The enclosure elements 60a, 62a may glide on each other in the overlap region.

The aircraft seat module 10a is realized so as to be especially advantageously safe for a passenger sitting on the aircraft seat 42a. A wall of the aircraft seat region 26a that is arranged in front of the aircraft seat 42a is realized by a second enclosure unit 154a of the aircraft seat module that is arranged in front of the aircraft seat module 10a. The second enclosure unit 154a is formed in the same manner as the enclosure unit 58a of the afore-described aircraft seat module 10a. In a rear region 150a next to the aircraft seat 42a, the enclosure unit 154a forms a surface that is oriented substantially orthogonally to the aircraft cabin middle axis 18a. The rear region 150a is realized as a region of the enclosure unit 154a that faces towards the central aisle 20a. The rear region 150a forms a possible head impact region for a passenger or a crash test dummy in a crash or in a crash test. The rear region 150a is situated directly in the deceleration direction of the aircraft seat 42a. Advantageously, in a crash or in a crash test an impact of a passenger's or a crash text dummy's head can be advantageously softened or prevented by the three-point belt unit 132a. In addition, the rear region 150a may be realized as a cushioned region for dampening a possible impact. Due to the oblique positioning of the aircraft seat 42a by the angle α, the orientation of the rear region 150a relative to the aircraft seat 42a is particularly advantageous.

The enclosure unit 154a forms in a front region 152a in front of the aircraft seat 42a a surface which is oriented obliquely to the aircraft cabin middle axis 18a. The front region 152a forms a leg support region. The front region 152a is tilted with respect to the rear region 150a. The front region 152a is configured so as to allow the legs of a passenger or a crash test dummy sitting on the aircraft seat 42a to be supported at the front region 152a in a crash or in a crash test. In a crash or in a crash test, due to the acting accelerations, the legs of a passenger or crash test dummy sitting on the aircraft seat 42a hit on the front region 152a that is realized as a leg support region. In this way a twisting of the passenger can be prevented. This also allows reducing a twisting of the passenger's or the crash test dummy's torso. As a result, particularly advantageous crash test results are achievable and an especially safe aircraft seat module 10a can be provided. This also advantageously permits doing without additional securing systems, like for example an airbag or the like.

Preferably a usable area 158a is arranged in front of the foremost aircraft seat module of the aircraft seat arrangement 22a. The usable area 158a is arranged between a transverse panel 160a, which separates off a portion of the aircraft cabin 12a, in which the aircraft seat arrangements 22a, 24a are arranged, and the foremost aircraft seat module. The aircraft seat arrangement 22a comprises a front enclosure element 162a. The front enclosure element 162a is realized essentially in the same manner as the second enclosure elements 62a of the enclosure units 58a of the aircraft seat modules 10a, 28a. The front enclosure element 162a delimits the aircraft seat region of the foremost aircraft seat module of the aircraft seat arrangement 22a frontwards. In the usable area 158a between the transverse panel 160a and the front enclosure element 162a, a stowage region 164a is arranged. The stowage region 164a preferably has several stowage compartments which are configured for stowing objects. The stowage region 164a may, for example, be intended for the stowage of utensils of an aircraft crew. Preferably the stowage region 164a may be configured for the stowage of carry-on baggage. Preferably the stowage region 164a may be assigned to the foremost aircraft seat module of the aircraft seat arrangement 22a. Preferably the usable area 158a may be intended for an augmentation of the foremost aircraft seat module of the aircraft seat arrangement 22a. For example, the usable area 158a could be used at least partly for an augmentation of the aircraft seat region in which the front enclosure element 162a is realized so as to be adjustable or removable.

Figure 6:
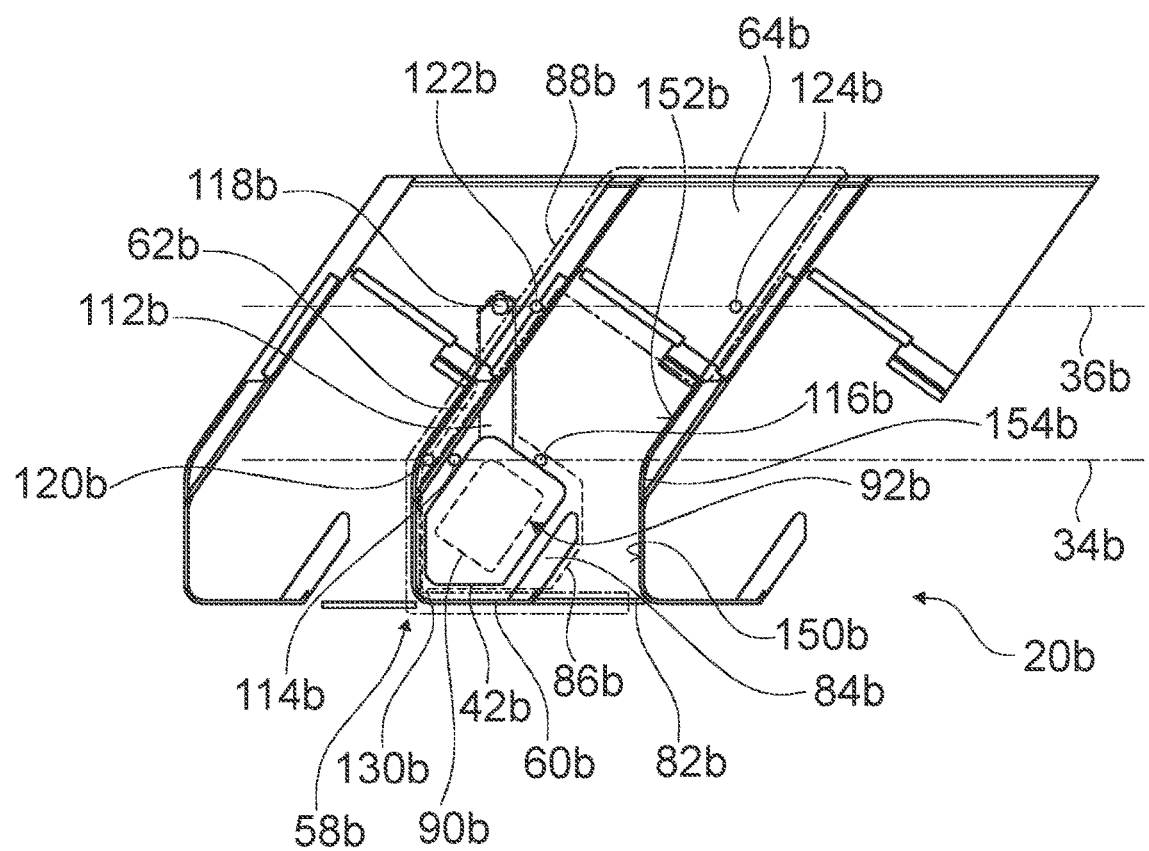

In FIG. 6 a further exemplary embodiment of the invention is shown. The following description and the drawing are essentially limited to the differences between the exemplary embodiments, wherein with regard to components having the same denomination, in particular to components having the same reference numeral, the figures and/or the description of the other exemplary embodiment, in particular FIGS. 1 to 5, may principally be referred to. In order to distinguish between the exemplary embodiments, the letter a has been added to the reference numerals of the exemplary embodiment in FIGS. 1 to 5. In the exemplary embodiment of FIG. 6, the letter a has been replaced by the letter b.

FIG. 6 shows a portion of an aircraft cabin 12b according to the invention with an aircraft seat arrangement 22b according to the invention. The aircraft seat arrangement 22b comprises a first aircraft seat module 10b. The first aircraft seat module 10b delimits an aircraft seat region 26b. The aircraft seat arrangement 22b comprises a second aircraft seat module 28b. The second aircraft seat module 28b delimits a further aircraft seat region 30b. The aircraft seat module 10b comprises an aircraft seat 42b. The aircraft seat 42b is realized as a full-flat seat. The aircraft seat 42b is adjustable between a TTL sitting position, that is an upright sitting position, and a lying-down position. In the lying-down position the aircraft seat 42b forms a substantially planar lying-down surface. The aircraft seat 42b is configured to be mounted in the aircraft cabin 12b at an angle α of more than 30 degrees to 80 degrees. In the exemplary embodiment shown, the aircraft seat 42b is mounted in the aircraft cabin 12b at an angle α of 55 degrees.

The aircraft seat module 10b comprises an enclosure unit 58b. The enclosure unit 58b is configured to at least partly delimit the aircraft seat region 26b of the first aircraft seat module 10b. The enclosure unit 58b delimits the aircraft seat region 26b of the aircraft seat module 10b in a region of the aircraft seat 42b. The enclosure unit 58b delimits the aircraft seat region 26b in a region behind the aircraft seat 42b. The enclosure unit 58b delimits the aircraft seat region 26b in a region sideways and in front of the aircraft seat 42b. The enclosure unit 58b comprises a first enclosure element 60b. The first enclosure element 60b is configured to at least partly delimit the aircraft seat region 26b of the aircraft seat module 10b. The enclosure unit 58b comprises a second enclosure element 62b. The second enclosure element 62b is configured to at least partly delimit the aircraft seat region 26b of the aircraft seat module 10b. The second enclosure element 62b delimits the aircraft seat region 26b of the aircraft seat module 10b at least partly. The second enclosure element 62b delimits the aircraft seat region 26b of the aircraft seat module 10b in a region sideways of the aircraft seat 42b.

The aircraft seat module 10b comprises a console unit 64b. The console unit 64b is arranged frontally in front of the aircraft seat 42b. The console unit 64b is connected with the enclosure unit 58b of the aircraft seat module 10b. The console unit 64b is mounted on the second enclosure element 62b of the enclosure unit 58b. The aircraft seat module 10b comprises a second console unit 76b. The console unit 76b is attached on an inner side of the enclosure unit 58b of the aircraft seat module 10b, on the second enclosure element 62b. The console unit 76b is arranged in a region in front of the aircraft seat 42b. The aircraft module 10b may comprise a door element 82b. The door element 82b is arranged so as to be displaceable on the first enclosure element 60b of the enclosure unit 58b. The aircraft seat module 10b comprises a first armrest element 84b. The first armrest element 84b is arranged sideways of the aircraft seat 42b.

The aircraft seat module 10b is composed of two separately realized modules 86b, 88b. The aircraft seat module 10b is implemented by a 16G module 86b and a 9G module 88b. The 16G module 86b and the 9G module 88b are realized separately from each other. Several components of the aircraft seat module 10b in each case form the 9G module 88b, respectively the 16G module 86b. Differently than in the first exemplary embodiment of FIGS. 1 to 5, the first enclosure element 60b of the enclosure unit 58b is realized as part of the 9G module 88b. The first enclosure element 60b of the enclosure unit 58b is mounted on a cabin floor 32b of the aircraft cabin 12b via an assembly frame 140b of the 9G module 88b. In contrast to the first exemplary embodiment, the two enclosure elements 60b, 62b of the enclosure unit 58b may be fixedly connected with each other. It is thus principally conceivable that the two enclosure elements 60b, 62b of the enclosure unit 58b are fixedly screwed with each other, or that the enclosure elements 60b, 62b are realized integrally with each other. Furthermore the door element 82b, which is connected with the first enclosure element 60b, is realized as part of the 9G module 88b. By the assignment of the door element 82b and the first enclosure element 60b to the 9G module 88b, the door element 82b and the first enclosure element 60b may be realized in a particularly lightweight manner as the forces they have to endure are smaller. The 16G module 86b comprises the aircraft seat 42b and only the armrest element 84b. Principally, it would also be conceivable that the armrest element 84b is also assigned to the 9G module 88b.

It would principally also be conceivable that the aircraft cabin 12b has besides the fastening rails 34b, 38b, on a side of the fastening rail 34b that faces towards the central aisle 20b, further fastening points via which in particular the 9G module 88b can be additionally coupled with the cabin floor 32b. The additional fastening points may be realized as individual fastening points which may be individually embedded in the cabin floor 32b at regular distances. The additional fastening points could preferably be arranged in a region that is in a mounted state of the aircraft seat modules 10b, 28b located below the enclosure element 60b that faces towards the central aisle 20b. By way of the additional fastening points, the aircraft seat module 10b, in particular the 9G module 88b of the aircraft seat module 10b, could advantageously be additionally connected to the cabin floor 32b in a region that is at a distance from the fastening rails 34b, 36b. This would enable the 9G module 88b, in particular a load-bearing basic structure of the 9G module, like in particular an assembly frame or the enclosure unit 58b, to be implemented in a structurally less rigid and stable manner as forces could be additionally transferred into the cabin floor 32b via the further fastening points. This would allow an especially lightweight implementation of the 9G module, and thus of the entire aircraft seat module 10b.

The invention claimed is:

1. An aircraft seat module which forms an aircraft seat region,
    with an aircraft seat
        that is configured to be mounted in an aircraft cabin at an angle α of 30 degrees to 80 degrees, relative to a central axis of the aircraft cabin in a direction of flight, and
        that comprises at least a base frame and a cinematics unit,
    with an enclosure unit comprising
        a first enclosure element, which delimits the aircraft seat region at least partially in a region of the aircraft seat, and
        a second enclosure element, which delimits the aircraft seat region partially at least in a region in front of the aircraft seat,
    with an ottoman providing a footrest region, and
    with a console unit that forms at least one stowage and/or depositing region of the aircraft seat region,
    wherein the aircraft seat is integrated into a realized formed 16G module, and the second enclosure element, the ottoman and the console unit are combined in a separately formed 9G module,
    wherein the 16G module and the 9G module are intended to be mounted separately on a cabin floor,
    wherein the 16G module comprises an assembly frame, which is configured for a connection to the cabin floor and comprises three 16G fitting elements, each of which is configured for a connection to a fastening rail,
    wherein the assembly frame comprises a main assembly region and a beam that extends away from the main assembly region,
    wherein the aircraft seat is connected in the main assembly region,
    wherein one of the 16G fitting elements is connected to an end of the beam that is distant from the main assembly region, and
    wherein two of the 16G fitting elements, which are configured for a connection to a same fastening rail, are arranged in the main assembly region of the assembly frame.

2. The aircraft seat module according to claim 1,
    wherein the first enclosure element forms part of the separately formed 16G module.

3. The aircraft seat module according to claim 1,
    wherein the 16G module and/or the 9G module are/is in each case configured to be fixedly coupled with the cabin floor via three mounting points.

4. The aircraft seat module according to claim 1, comprising
    a door element, which is displaceably connected with the first enclosure element and forms part of the 16G module.

5. The aircraft seat module according to claim 1, comprising an armrest element, which is displaceably connected with the first enclosure element and forms part of the 16G module.

6. The aircraft seat module according to claim 1, wherein the first enclosure element forms part of the 9G module.

7. The aircraft seat module according to claim 1, wherein the 16G module and the 9G module are formed free of a direct fixed connection.

8. The aircraft seat module according to claim 1, wherein a region between the ottoman and the aircraft seat is formed at least partly free of a pedestal.

9. An aircraft cabin with a single central aisle and with at least one aircraft seat arrangement comprising several aircraft seat modules according to claim 1, which is arranged between the central aisle and a first side panel, and with a second aircraft seat arrangement comprising several aircraft seat modules, which is arranged between the central aisle and a second side panel.

10. The aircraft cabin according to claim 9, wherein the aircraft seat modules of the aircraft seat arrangement have a seat distance (X) in a range from 838 mm (33 inches) to 1016 mm (40 inches) and in each case comprise an aircraft seat mounted at an angle α of 30 degrees to 80 degrees relative to the central axis of the aircraft cabin in the direction of flight.

11. The aircraft seat module according to claim 1, wherein the first enclosure element and the second enclosure element have an overlap region, in which the two enclosure elements overlap wherein the two enclosure elements are not coupled directly with each other.

12. The aircraft seat module according to claim 11, wherein between the two overlapped enclosure elements, an intermediate element is formed as an elastic element, preferably as a rubber sealing lip, wherein the intermediate element is only fixed on the enclosure elements from one module.

13. The aircraft seat module according to claim 1, wherein the aircraft seat is mounted in an aircraft cabin at an angle α of 45 degrees to 65 degrees, relative to the central axis of the aircraft cabin in the direction of flight.

14. The aircraft cabin according to claim 10, wherein the aircraft seat is mounted at an angle α of 45 degrees to 65 degrees, relative to the central axis of the aircraft cabin in the direction of flight.

15. The aircraft seat module according to claim 1, wherein the 16G module and the 9G module are independently and, in particular, separately attached to the fastening rails, via three fitting elements for the installation of the 16G module and via the three fitting elements for the installation of the 9G module.

* * * * *